United States Patent
Sun et al.

(10) Patent No.: US 9,854,481 B2
(45) Date of Patent: Dec. 26, 2017

(54) METHOD AND APPARATUS FOR MAINTAINING SERVICE CONTINUITY OF USER EQUIPMENT AFTER TRACKING AREA IS UPDATED

(71) Applicant: ZTE Corporation, Shenzhen (CN)

(72) Inventors: Wei Sun, Shenzhen (CN); Rong Zhang, Shenzhen (CN)

(73) Assignee: XI'AN ZHONGZING NEW SOFTWARE CO. LTD., Xi'an (CN)

( * ) Notice: Subject to any disclaimer, the term of this patent is extended or adjusted under 35 U.S.C. 154(b) by 7 days.

(21) Appl. No.: 14/397,283

(22) PCT Filed: Apr. 3, 2013

(86) PCT No.: PCT/CN2013/073698
§ 371 (c)(1),
(2) Date: Oct. 27, 2014

(87) PCT Pub. No.: WO2013/159638
PCT Pub. Date: Oct. 31, 2013

(65) Prior Publication Data
US 2015/0334606 A1    Nov. 19, 2015

(30) Foreign Application Priority Data
Apr. 25, 2012 (CN) .......................... 2012 1 0125209

(51) Int. Cl.
*H04W 36/00* (2009.01)
*H04W 76/04* (2009.01)
(Continued)

(52) U.S. Cl.
CPC ....... *H04W 36/0033* (2013.01); *H04W 36/00* (2013.01); *H04W 48/20* (2013.01);
(Continued)

(58) Field of Classification Search
None
See application file for complete search history.

(56) References Cited

U.S. PATENT DOCUMENTS

2012/0110197 A1* 5/2012 Miklos ................. H04W 36/12
709/228

FOREIGN PATENT DOCUMENTS

CN      101296496 A    10/2008
CN      101431786 A     5/2009
(Continued)

OTHER PUBLICATIONS

ETSI TS 123 401 V10.7.0 (Mar. 2012) pp. 92-98.*
(Continued)

*Primary Examiner* — Christopher Crutchfield
*Assistant Examiner* — Tito Pham
(74) *Attorney, Agent, or Firm* — Cantor Colburn LLP

(57) ABSTRACT

Provided are a method and an apparatus for maintaining service continuity of a UE after a tracking area is updated. In the method, after a UE initiates a TAU request, an MME judges whether an updated target SGW is the same as a source SGW (S302); in a case where a judgment result is that the updated target SGW is not the same as the source SGW, the MME further judges whether an eNodeB currently accessed by the UE is changed (S304); and in a case where the eNodeB is not changed, the MME selects the target SGW to serve the UE and sends the eNodeB a notification message indicating that the UE is switched over to a serving area of the target SGW, or the MME stops selecting an SGW for the UE but directly instructs the UE to continue to be served by the source SGW (S306).

8 Claims, 8 Drawing Sheets

(51) Int. Cl.
    *H04W 48/20*     (2009.01)
    *H04W 60/04*     (2009.01)
    H04W 88/00     (2009.01)
    H04W 92/04     (2009.01)

(52) U.S. Cl.
    CPC ......... *H04W 60/04* (2013.01); *H04W 76/041* (2013.01); *H04W 76/04* (2013.01); *H04W 88/005* (2013.01); *H04W 92/045* (2013.01)

(56) References Cited

FOREIGN PATENT DOCUMENTS

| | | | |
|---|---|---|---|
| CN | 101541109 A | 9/2009 | |
| CN | 102083051 A | 6/2011 | |
| CN | 102761965 A | 10/2012 | |
| EP | 2372965 A1 | * 5/2011 | |
| KR | 20110070570 A | 6/2011 | |
| WO | 2012041420 A1 | 5/2012 | |

OTHER PUBLICATIONS

International Search Report for corresponding application PCT/CN2013/073698 filed Apr. 3, 2013; dated Jul. 11, 2013.
ETSI: "LTE, General Packet Radio Service (GPRS) Enhancements for Evolved Universal Terrestrial Radio Access Network (E-UTRAN) Access", vol. 70, Mar. 12, 2012, XP055164712.
European Search Report for corresponding application EP 13 78 2127; Report dated Jul. 13, 2015.
ZTE, "Corrections to TAU Procedure with Serving GW change", 3GPP Draft, vol. SA WG2, No. Elbonia 20110117, Jan. 26, 2011, XP050631321.

* cited by examiner

METHOD AND APPARATUS FOR MAINTAINING SERVICE CONTINUITY OF USER EQUIPMENT AFTER TRACKING AREA IS UPDATED

TECHNICAL FIELD

The disclosure relates to the field of communications, and in particular to a method and an apparatus for maintaining service continuity of a user equipment after a tracking area is updated.

BACKGROUND

In an EPS (evolved packet system) of an LTE (long term evolution) system, an SGW (serving gateway) has a corresponding serving area, and the granularity of the serving area is a TA (tracking area). The serving areas of different SGWs may be overlapped. An MME (mobility management entity) selects an SGW for a UE (user equipment) based on a network topology structure.

When a UE triggers a TAU (tracking area update) in which a TA is changed in a moving process, if a TA that the UE newly enters is not located in the serving area of an original SGW accessed by the UE, the MME may select a new SGW for the UE. If an evolved base station (eNodeB) accessed by the UE is not changed at this moment, since the SGW is changed, an IP (Internet protocol) address and a TEID (tunnel endpoint identifier) of the UE bearer at the SGW side on an S1-U interface (an interface in a 3GPP protocol) will change. However, at this moment, the eNodeB cannot learn the change of the bearer uplink IP address and TEID of the UE, thus resulting in a service interruption of the UE, and the UE service cannot be recovered before the UE accesses a network again or performs switching of the SGW.

The scenario above is described below in detail from two aspects.

Firstly, a scenario condition of a scenario where "since a tracking area update (TAU) in which an evolved base station (eNodeB) is not changed and a serving gateway (SGW) is changed occurs to a user equipment (UE), a service interruption of the UE is resulted in after the TAU process is completed" is specified as follows.

An MME maintains a plurality of tracking area lists (TA lists), wherein TACs (tracking area codes) contained in two TA lists therein are as follows:

TA List1={TAC0, TAC1, TAC2, TAC3 . . . }; and
TA List2={TAC4, TAC5, TAC6 . . . }.

TAC values contained in these two TA lists do not have any intersection, and respectively correspond to serving areas of two SGWs. TA List1 corresponds to SGW1, and TA List2 corresponds to SGW2. The MME, SGW1 and SGW2 are all coupled to the eNodeB which serves for cell A and cell B, the TAC of cell A is TAC 1, and the TAC of cell B is TAC 4.

On the basis of the scenario condition above, the scenario above is further divided into two different scenarios according to two reasons triggering the TAU, and the two scenarios are discussed respectively in combination with FIG. 1 and FIG. 2 as follows.

Scenario I, the UE does not move, and a cell TAC configuration modification at the eNodeB side triggers the UE to initiate a TAU where the TA is changed.

Referring to FIG. 1, in this scenario, the eNodeB supports the TACs in TA List1 and TA List 2 simultaneously. The UE is accessed in cell A under the eNodeB, the TAC of cell A is TAC=TAC 1, and SGW1 is accessed at a core network side. At this moment, the TAC of cell A is manually modified at the eNodeB side from TAC 1 to TAC 4, thereby triggering the eNodeB to issue update broadcast information. After receiving the broadcast, the UE finds that the TA is changed, thereby triggering a TAU flow changing the TA. The MME finds that the TAC of the TA where the UE is located when initiating the TAU is TAC 4, belonging to TA List2, and corresponding to the serving area of SGW2. At this moment, the MME reselects an SGW for the UE, creates bearer context (including the bearer uplink IP address and TED of the UE) for the UE on SGW2, and deletes bearer context (including the bearer uplink IP address and TEID of the UE) of the UE in SGW1. After the TAU is successful, the MME replies with a tracking area update accept message to the UE. However, in this TAU process, there is no signalling message on an S1 interface to notify the eNodeB that the SGW accessed by the UE has been changed, and thus the eNodeB will still forward an uplink service packet of the UE to SGW1. However, at this moment, the bearer context (including the bearer uplink IP address and TEID of the UE) of the UE has been deleted in SGW1, and although SGW1 has received the uplink service packet of the UE, SGW1 cannot perform an operation of the next step, resulting in a service interruption of the UE.

Scenario II, the UE moves in the eNodeB, and a cell change at the eNodeB side triggers the UE to initiate a TAU in which the TA is changed.

Referring to FIG. 2, in this scenario, the eNodeB supports the TACs in TA List1 and TA List 2 simultaneously. The UE is accessed in cell A under the eNodeB, the TAC of cell A is TAC=TAC 1, SGW1 is accessed at a core network side, and the TAC of cell B of the eNodeB is TAC=TAC 4. The UE switches from cell A to cell B, and after the switching is completed, the UE finds that the TA is changed and therefore initiates a TAU. The MME finds that the TAC of the TAU initiated by the UE is TAC 4, belonging to TA List2, and corresponding to the serving area of SGW2. At this moment, the MME reselects an SGW for the UE, creates bearer context (including the bearer uplink IP address and TEID of the UE) for the UE on SGW2, and deletes bearer context (including the bearer uplink IP address and TEID of the UE) of the UE in SGW1. After the TAU is successful, the MME replies with a tracking area update accept message to the UE. However, in this TAU process, there is no signalling on an S1 interface to notify the eNodeB that the SGW accessed by the UE has been changed, and thus the eNodeB will still forward an uplink service packet of the UE to SGW1. However, at this moment, the bearer context (including the bearer uplink IP address and TEID of the UE) of the UE has been deleted in SGW1, and although SGW1 has received the uplink service packet of the UE, SGW1 cannot perform an operation of the next step, resulting in a service interruption of the UE.

With regard to the problem in the related art of resulting in a UE service interruption since an evolved base station (eNodeB) cannot learn that the bearer uplink IP address and TEID of the UE are changed in the scenarios above, there is no effective solution proposed yet.

SUMMARY

The embodiments of the disclosure provide a method and an apparatus for maintaining service continuity of a user equipment after a tracking area is updated, so as to at least solve the problem above.

According to one embodiment of the disclosure, provided is a method for maintaining service continuity of a user equipment after a tracking area is updated, including: after a user equipment (UE) initiates a tracking area update (TAU) request, a mobility management entity (MME) judging whether an updated target serving gateway (SGW) is the same as a source serving gateway (SGW); in a case where a judgment result is that the updated target SGW is not the same as the source SGW, the MME further judging whether an evolved base station (eNodeB) currently accessed by the UE is changed; and in a case where the eNodeB is not changed, the MME selecting the target SGW to serve the UE and sending the eNodeB a notification message indicating that the UE is switched over to a serving area of the target SGW, or the MME stopping selecting an SGW for the UE but directly instructing the UE to continue to be served by the source SGW.

In the described embodiment, after the MME selects the target SGW to serve the UE, the method further includes: the MME confirming that a core network has successfully established first bearer context for the UE on the target SGW; and the MME confirming that a tracking area update is successful according to the establishment of the first bearer context, and sending an accept message indicating that the tracking area update is successful to the UE.

In the described embodiment, the MME sending the eNodeB the notification message indicating that the UE is switched over to the serving area of the target SGW includes: the MME acquiring an Internet protocol (IP) address and a tunnel endpoint identifier (TEID) of the UE bearer on the target SGW, wherein the IP address and the TEID are able to indicate that the UE has been switched over to the serving area of the target SGW; and the MME carrying the IP address and the TEID in the notification message and sending the notification message to the eNodeB.

In the described embodiment, after the MME carries the IP address and the TEID in the notification message and sends the notification message to the eNodeB, the method further includes: the eNodeB switching an uplink of a UE bearer from the source SGW onto the target SGW according to the IP address and the TEID in the notification message; and in a case where a switching operation is successful, receiving an uplink service packet sent by the UE, and forwarding the uplink service packet to the target SGW.

In the described embodiment, after the MME selects the target SGW to serve the UE and sends the eNodeB the notification message indicating that the UE is switched over to the serving area of the target SGW, or the MME stops selecting an SGW for the UE but directly instructs the UE to continue to be served by the source SGW, the method further includes: the MME sending an accept message indicating that a tracking area update is successful to the UE.

According to another embodiment of the disclosure, provided is an apparatus for maintaining service continuity of a user equipment after a tracking area is updated, wherein the apparatus is located in a mobility management entity (MME) and includes: a first judgment component, configured to, after a user equipment (UE) initiates a tracking area update (TAU) request, judge whether an updated target serving gateway (SGW) is the same as a source serving gateway (SGW); a second judgment component, configured to, in a case where a judgment result of the first judgment component is that the updated target SGW is not the same as the source SGW, judge whether an evolved base station (eNodeB) currently accessed by the UE is changed; and an execution component, configured to, in a case where the eNodeB currently accessed by the UE is not changed, select the target SGW to serve the UE and send the eNodeB a notification message indicating that the UE is switched over to a serving area of the target SGW, or stop selecting an SGW for the UE but directly instruct the UE to continue to be served by the source SGW.

In the described embodiment, the apparatus further includes: a first confirmation component, configured to, after the execution component selects the target SGW to serve the UE, confirm that a core network has successfully established first bearer context for the UE on the target SGW; and a second confirmation component, configured to confirm that a tracking area update is successful according to the establishment of the first bearer context, and send an accept message indicating that the tracking area update is successful to the UE.

In the described embodiment, the execution component includes: an acquisition unit, configured to acquire an Internet protocol (IP) address and a tunnel endpoint identifier (TEID) of the UE bearer on the target SGW, wherein the IP address and the TEID are able to indicate that the UE has been switched over to the serving area of the target SGW; and a sending unit, configured to carry the IP address and the TEID in the notification message and sending the notification message to the eNodeB.

In the described embodiment, the execution component further includes: a switching instruction unit, configured to instruct the eNodeB to switch an uplink of a UE bearer from the source SGW onto the target SGW according to the IP address and the TEID in the notification message; and a forwarding instruction unit, configured to, in a case where a switching operation is successful, instruct the eNodeB to receive an uplink service packet sent by the UE and forward the uplink service packet to the target SGW.

In the described embodiment, the apparatus further includes: a sending component, configured to, after the execution component selects the target SGW to serve the UE and sends the eNodeB the notification message indicating that the UE is switched over to a serving area of the target SGW, or stops selecting an SGW for the UE but directly instructs the UE to continue to be served by the source SGW, send an accept message indicating that the tracking area update is successful to the UE.

By means of the embodiments of the disclosure, in the scenario where a tracking area update (TAU) in which an eNodeB is not changed while an SGW is changed occurs to a UE, an MME selects a target SGW to serve the UE and sends the eNodeB a notification message indicating that the UE is switched over to a serving area of the target SGW, or the MME stops selecting an SGW for the UE but directly instructs the UE to continue to be served by a source SGW, so as to solve the problem of a UE service interruption since the eNodeB cannot learn a bearer uplink IP address and TEID change of the UE in the scenario where a tracking area update (TAU) in which the eNodeB is not changed while the SGW is changed occurs to the UE, thereby maintaining service continuity of a UE after a TAU process, and improving the user experience.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the accompanying drawings.

DETAILED DESCRIPTION OF EXEMPLARY EMBODIMENTS

The disclosure is described below with reference to the accompanying drawings and embodiments in detail. Note that, the embodiments of the disclosure and the features of the embodiments can be combined with each other if there is no conflict.

Figure 1:
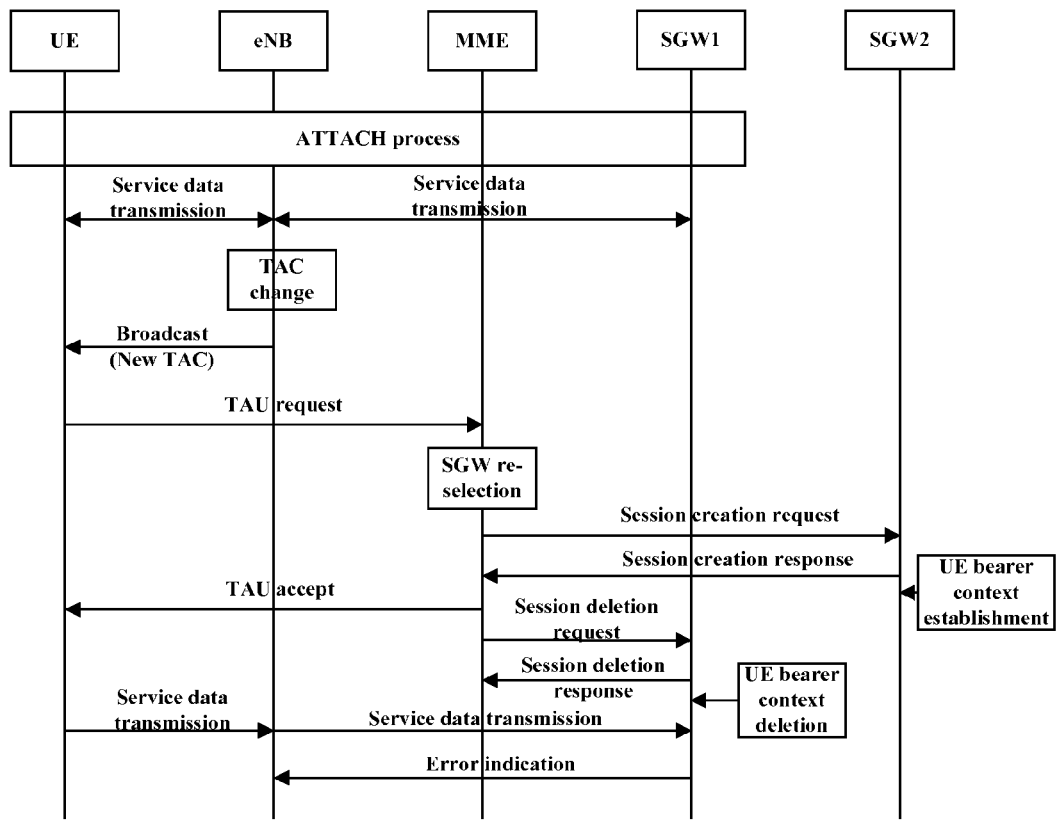
FIG. 1 is a schematic diagram of a UE service interruption after a UE initiates, due to a cell TAC configuration change of the eNodeB, a TAU where an eNodeB is not changed and an SGW is changed (i.e. scenario I) according to related art.
Figure 2:
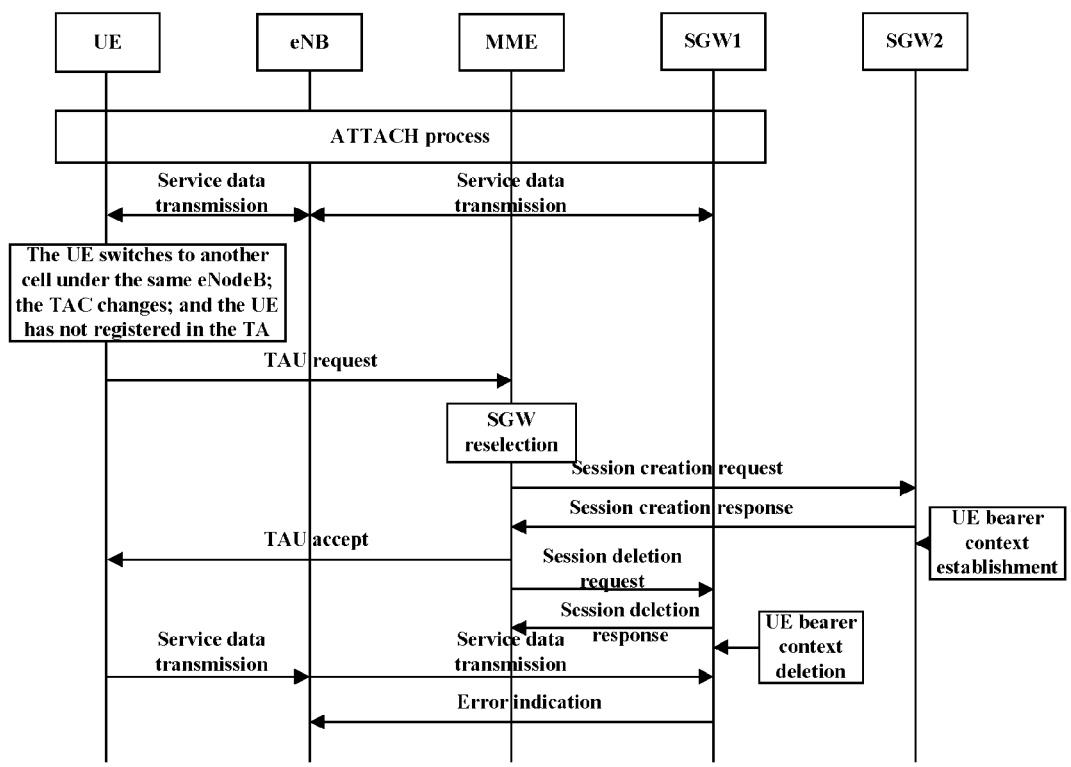
FIG. 2 is a schematic diagram of a service interruption after a UE initiates, due to the UE movement between different TAs in the eNodeB, a TAU where an eNodeB is not changed and an SGW is changed (i.e. scenario II) according to related art.
Figure 3:
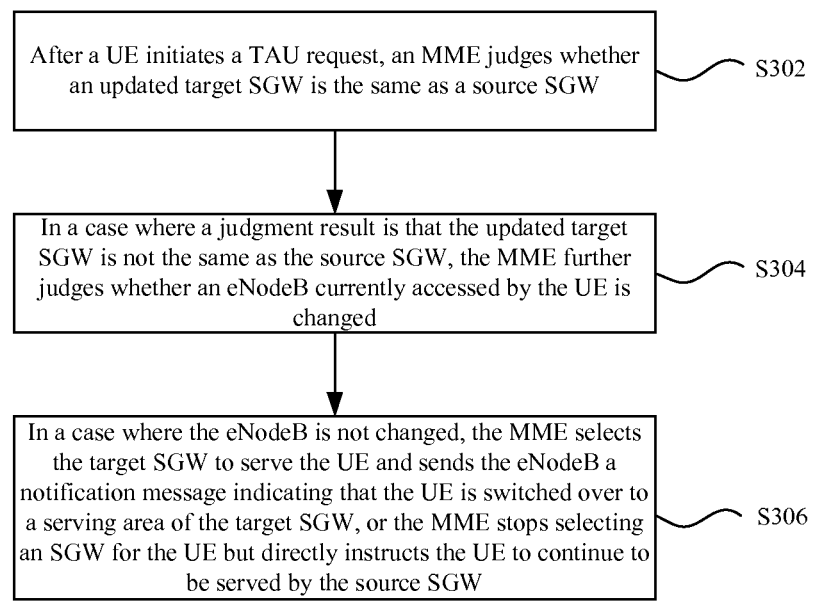
FIG. 3 is a flowchart of a method for maintaining service continuity of a user equipment after a tracking area is updated according to an embodiment of the disclosure.

FIG. 3 is a flowchart of a method for maintaining service continuity of a user equipment after a tracking area is updated according to an embodiment of the disclosure. As shown in FIG. 3, the method mainly includes the following steps (step S302-step S306).

Step S302, after a user equipment (UE) initiates a tracking area update (TAU) request, a mobility management entity (MME) judges whether an updated target serving gateway (SGW) is the same as a source serving gateway (SGW).

Step S304, in a case where a judgment result is that the updated target SGW is not the same as the source SGW, the MME further judges whether an evolved base station (eNodeB) currently accessed by the UE is changed.

Step S306, in a case where the eNodeB is not changed, the MME selects the target SGW to serve the UE and sends the eNodeB a notification message indicating that the UE is switched over to a serving area of the target SGW, or the MME stops selecting an SGW for the UE but directly instructs the UE to continue to be served by the source SGW.

In step S304 of the present embodiment, after the MME selects the target SGW to serve the UE, the MME may further confirm, in a case where a core network has successfully established first bearer context for the UE on the target SGW, that a tracking area update is successful according to the establishment of the first bearer context, and then send an accept message indicating that the tracking area update is successful to the UE.

In step S304 of the present embodiment, the MME sending the eNodeB a notification message indicating that the UE is switched over to a serving area of the target SGW may specifically include: the MME first acquiring an Internet protocol (IP) address and a tunnel endpoint identifier (TEID) of the UE bearer on the target SGW (wherein the IP address and the TEID are able to indicate that the UE has been switched over to the serving area of the target SGW), and then carrying the IP address and the TEID in the notification message and sending the notification message to the eNodeB.

For example, in practical applications, the following manner may be used.

Figure 4:
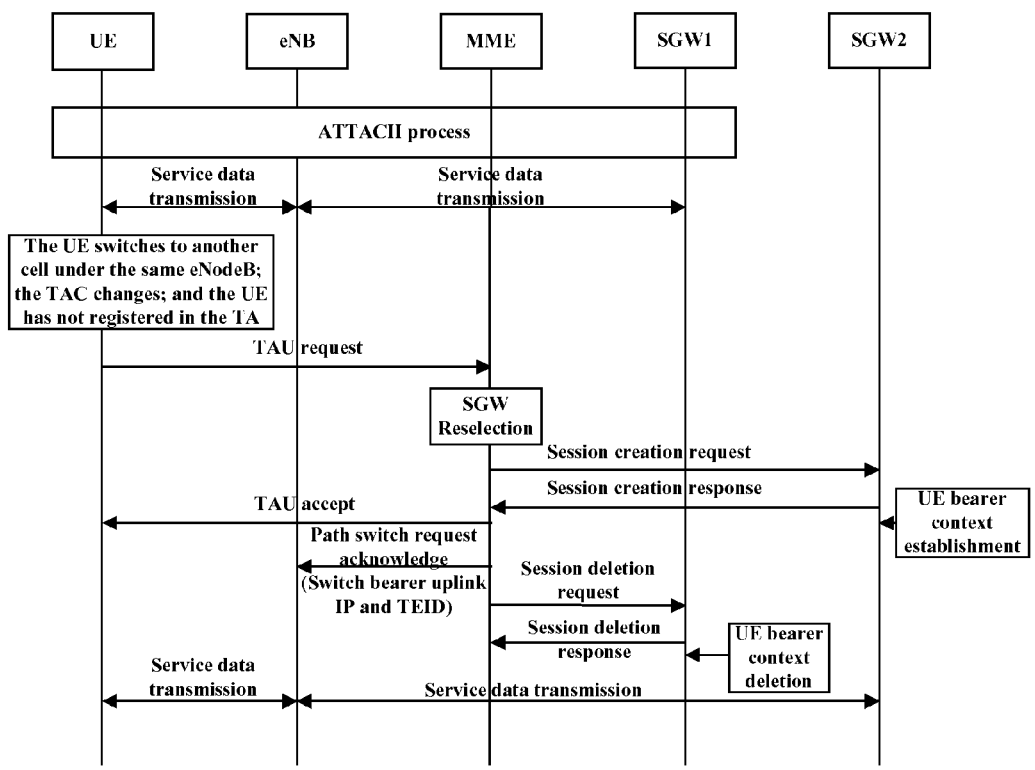
FIG. 4 is a schematic diagram showing how to maintain UE service continuity after a UE initiates a TAU where an eNodeB is not changed and an SGW is changed according to example embodiment I of the disclosure.

FIG. 4 is a schematic diagram showing how to maintain UE service continuity after a UE initiates a TAU where an eNodeB is not changed and an SGW is changed according to example embodiment I of the disclosure. As shown in FIG. 4, after a UE initiates a TAU request, an MME firstly judges whether an updated target TA exceeds a serving area of SGW1 originally accessed by the UE, and further judges whether an eNodeB currently accessed by the UE is changed, and if it is finally determined that an SGW of the UE is changed but the eNodeB accessed by the UE is not changed, the MME reselects the SGW for the UE. Furthermore, after the core network side has established new bearer context on SGW2, the MME may send a TAU ACC (tracking area update accept message) to the UE, and may also send a path switch request acknowledge message (carrying a transmission layer (i.e. IP) address and a TEID of the UE bearer on SGW2) to the eNodeB). After receiving the path switch request acknowledge message, the eNodeB performs bearer address and TEID uplink switching locally (i.e. migrating an uplink path of the eNodeB from SGW1 to SGW2), and forwards an uplink service packet received from the UE to SGW2. In this way, after the TAU is completed, the service of the UE is successfully switched to SGW2, thereby maintaining service continuity of the UE.

In the present embodiment, after the MME carries the IP address and the TEID in the notification message and sends same to the eNodeB, the eNodeB may then switch an uplink of a UE bearer from the source SGW onto the target SGW according to the IP address and the TEID in the notification message, and in a case where a switching operation is successful, receive an uplink service packet sent by the UE, and forward the uplink service packet to the target SGW.

For example, in practical applications, when the MME stops selecting an SGW for the UE but directly instructs the UE to continue to be served by a source SGW, the following manner may be used.

Figure 5:
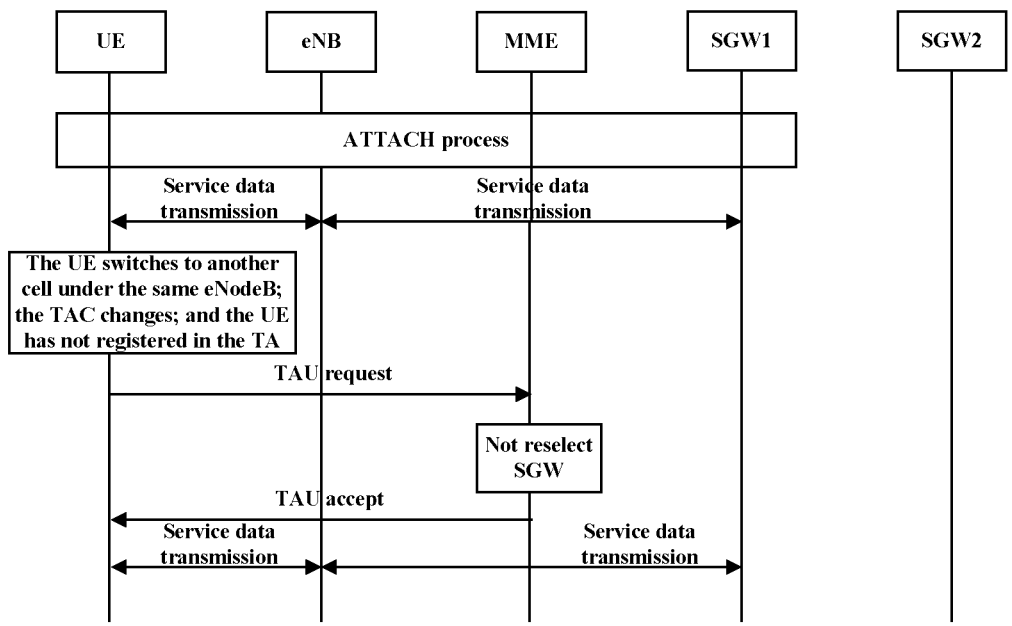
FIG. 5 is a schematic diagram showing how to maintain UE service continuity after a UE initiates a TAU where an eNodeB is not changed and an SGW is changed according to example embodiment II of the disclosure.

FIG. 5 is a schematic diagram showing how to maintain UE service continuity after a UE initiates a TAU where an eNodeB is not changed and an SGW is changed according to example embodiment II of the disclosure. As shown in FIG. 5, after a UE initiates a TAU request, an MME firstly judges whether an updated target TA exceeds a serving area of SGW1 originally accessed by the UE, and further judges whether an eNodeB currently accessed by the UE is changed, and if it is finally determined that an SGW of the UE is changed but the eNodeB accessed by the UE is not changed, at this moment, the MME does not reselect the SGW for the UE anymore, and still allows the UE to be served by SGW1. At the same time, a TAU ACC (tracking area update accept message) is sent to the UE. In this way, after the TAU is completed, the UE continues to be served by SGW1, and thus service continuity of the UE is likewise maintained as well.

In the present embodiment, after the MME stops selecting an SGW for the UE but directly instructs the UE to continue to be served by a source SGW, the MME may also send an accept message indicating that the tracking area update is successful to the UE.

The implementation flow (including embodiment 1 and embodiment 2) of example embodiment I of the disclosure is illustrated below in detail in combination with FIG. 6 and FIG. 7.

Embodiment 1

Figure 6:
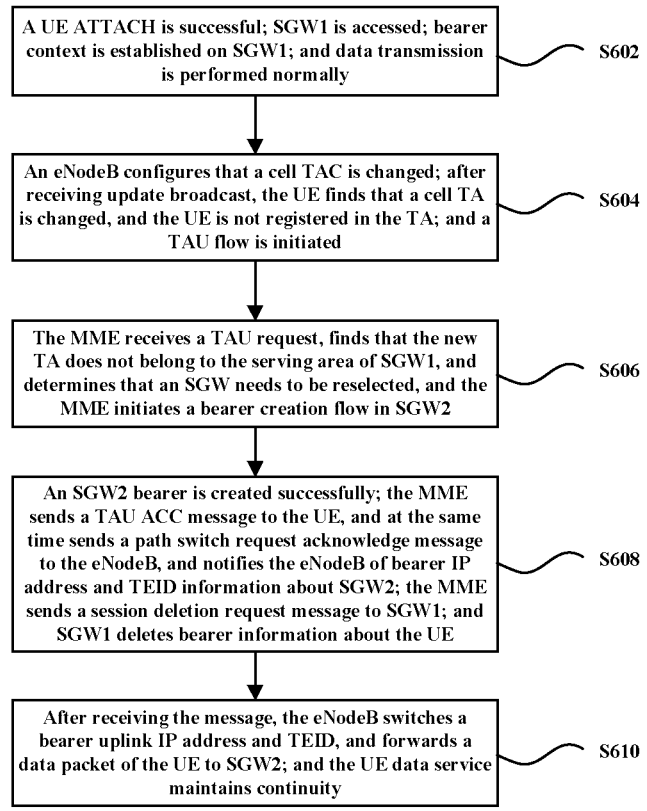
FIG. 6 is a flowchart showing how to maintain UE service continuity after a UE initiates, due to a cell TAC configuration change of the eNodeB, a TAU where an eNodeB is not changed and an SGW is changed (i.e. scenario I) according to example embodiment I of the disclosure.

FIG. 6 is a flowchart showing how to maintain UE service continuity after a UE initiates, due to a cell TAC configuration change of the eNodeB, a TAU where an eNodeB is not changed and an SGW is changed (i.e. scenario I) according to example embodiment I of the disclosure. As shown in FIG. 6, the flow includes the following steps (step S602-step S610).

Step S602, a UE ATTACH is successful; SGW1 is accessed; bearer context is established on SGW1; and data transmission is performed normally.

Step S604, an eNodeB configures that a cell TAC is changed; after receiving update broadcast, the UE finds that a cell TA is changed, and the UE is not registered in the TA; and a TAU flow is initiated.

Step S606, the MME receives a TAU request, finds that the new TA does not belong to the serving area of SGW1, and determines that an SGW needs to be reselected, and the MME initiates a bearer creation flow in SGW2.

Step S608, an SGW2 bearer is created successfully; the MME sends a TAU ACC message to the UE, and at the same time sends a path switch request acknowledge message to the eNodeB, and notifies the eNodeB of bearer IP address and TEID information of SGW2; the MME sends a session deletion request message to SGW1; and SGW1 deletes bearer information of the UE.

Step S610, after receiving the message, the eNodeB switches a bearer uplink IP address and TEID, and forwards a data packet of the UE to SGW2. The continuity of the data service of the UE is maintained.

Embodiment 2

Figure 7:
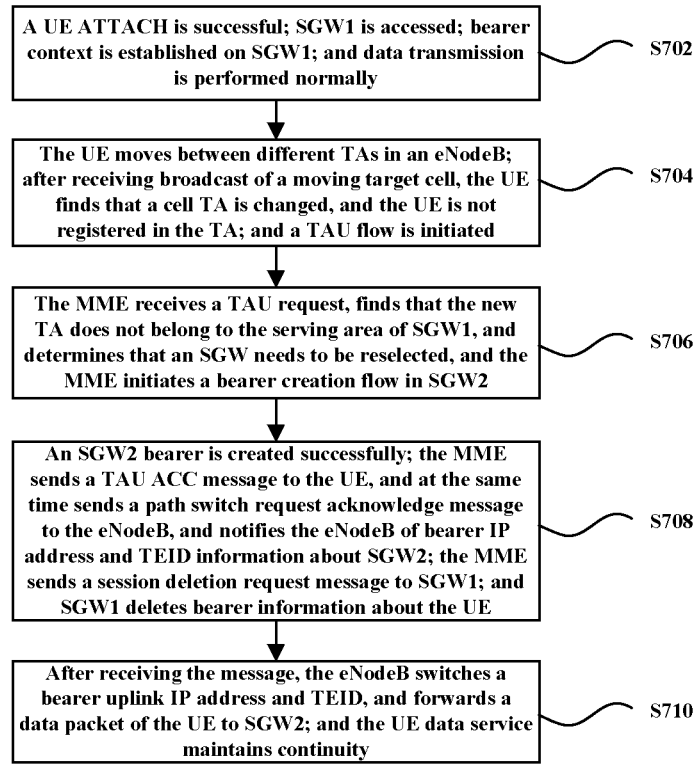
FIG. 7 is a flowchart showing how to maintain UE service continuity after a UE initiates, due to UE movement between different TAs in the eNodeB, a TAU where an eNodeB is not changed and an SGW is changed (i.e. scenario II) according to example embodiment I of the disclosure.

FIG. 7 is a flowchart showing how to maintain UE service continuity after a UE initiates, due to the UE movement between different TAs in the eNodeB, a TAU where an eNodeB is not changed and an SGW is changed (i.e. scenario II) according to example embodiment I of the disclosure. As shown in FIG. 7, the flow includes the following steps (step S702-step S710).

Step S702, a UE ATTACH is successful; SGW1 is accessed; bearer context is established on SGW1; and data transmission is performed normally.

Step S704, the UE moves between different TAs in an eNodeB; after receiving broadcast of a moving target cell, the UE finds that a cell TA is changed, and the UE is not registered in the TA; and a TAU flow is initiated.

Step S706, the MME receives a TAU request, finds that the new TA does not belong to the serving area of SGW1, and determines that an SGW needs to be reselected, and the MME initiates a bearer creation flow in SGW2.

Step S708, an SGW2 bearer is created successfully; the MME sends a TAU ACC message to the UE, and at the same time sends a path switch request acknowledge message to the eNodeB, and notifies the eNodeB of bearer IP address and TEID information about SGW2; the MME sends a session deletion request message to SGW1; and SGW1 deletes bearer information about the UE.

Step S710, after receiving the message, the eNodeB switches a bearer uplink IP address and TEID, and forwards a data packet of the UE to SGW2. The continuity of the data service of the UE is maintained.

The implementation flow (including embodiment 3 and embodiment 4) of example embodiment II of the disclosure is illustrated below in detail in combination with FIG. 8 and FIG. 9.

Embodiment 3

Figure 8:
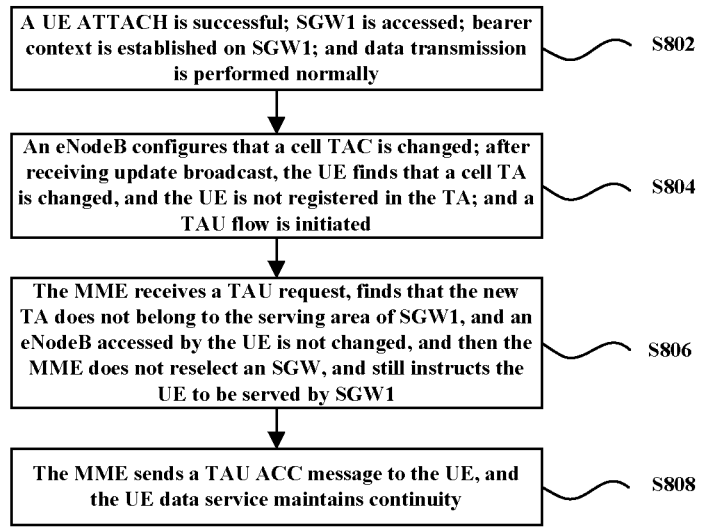
FIG. 8 is a flowchart showing how to maintain UE service continuity after a UE initiates, due to a cell TAC configuration change of the eNodeB, a TAU where an eNodeB is not changed and an SGW is changed (i.e. scenario I) according to example embodiment II of the disclosure.

FIG. 8 is a flowchart showing how to maintain UE service continuity after a UE initiates, due to a cell TAC configuration change of the eNodeB, a TAU where an eNodeB is not changed and an SGW is changed (i.e. scenario I) according to example embodiment II of the disclosure. As shown in FIG. 8, the flow includes the following steps (step S802-step S808).

Step S802, a UE ATTACH is successful; SGW1 is accessed; bearer context is established on SGW1; and data transmission is performed normally.

Step S804, an eNodeB configures that a cell TAC is changed; after receiving update broadcast, the UE finds that a cell TA is changed, and the UE is not registered in the TA; and a TAU flow is initiated.

Step S806, the MME receives a TAU request, finds that the new TA does not belong to the serving area of SGW1, and an eNodeB accessed by the UE is not changed, then the MME does not reselect an SGW and still instructs the UE to be served by SGW1.

Step S808, the MME sends a TAU ACC message to the UE, and the continuity of the data service of the UE is maintained.

Embodiment 4

Figure 9:
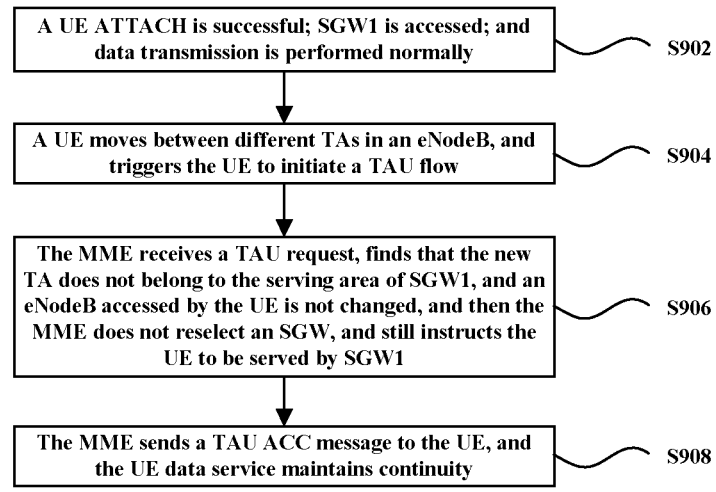
FIG. 9 is a flowchart showing how to maintain UE service continuity after a UE initiates, due to UE movement between different TAs in the eNodeB, a TAU where an eNodeB is not changed and an SGW is changed (i.e. scenario II) according to example embodiment II of the disclosure.

FIG. 9 is a flowchart showing how to maintain UE service continuity after a UE initiates, due to the UE movement between different TAs in the eNodeB, a TAU where an eNodeB is not changed and an SGW is changed (i.e. scenario II) according to example embodiment II of the disclosure. As shown in FIG. 9, the flow includes the following steps (step S902-step S908).

Step S902, a UE moves between different TAs in an eNodeB; after receiving broadcast of a moving target cell, the UE finds that a cell TA is changed, and the UE is not registered in the TA; and a TAU flow is initiated.

Step S904, the eNodeB configures that a cell TAC is changed; after receiving update broadcast, the UE finds that a cell TA is changed, and the UE is not registered in the TA; and a TAU flow is initiated.

Step S906, the MME receives a TAU request, finds that the new TA does not belong to the serving area of SGW1, and an eNodeB accessed by the UE is not changed, and then the MME does not reselect an SGW, and still instructs the UE to be served by SGW1.

Step S908, the MME sends a TAU ACC message to the UE, and the continuity of the data service of the UE is maintained.

By applying the method for maintaining service continuity of a user equipment after a tracking area is updated provided by the embodiments above, after a tracking area update (TAU) in which an eNodeB is not changed while an SGW is changed occurs to a UE, an MME selects a target SGW to serve the UE and sends the eNodeB a notification message indicating that the UE is switched over to a serving area of the target SGW, or the MME stops selecting an SGW for the UE but directly instructs the UE to continue to be served by a source SGW, which enables the eNodeB to adjust a UE service path in time after learning a bearer uplink IP address and TEID change of the UE in this scenario, thereby maintaining service continuity of a UE after a TAU process, and improving the user experience.

Figure 10:
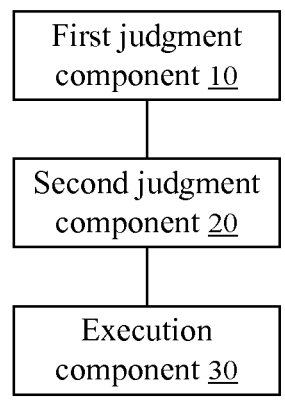
FIG. 10 is a structural block diagram of an apparatus for maintaining service continuity of a user equipment after a tracking area is updated according to an embodiment of the disclosure.

FIG. 10 is a structural block diagram of an apparatus for maintaining service continuity of a user equipment after a tracking area is updated according to an embodiment of the disclosure. The apparatus is used for implementing the method for maintaining service continuity of a user equipment after a tracking area is updated provided by the method embodiments above. As shown in FIG. 10, the apparatus mainly includes: a first judgment component 10, a second judgment component 20, and an execution component 30. The first judgment component 10 is configured to, after a user equipment (UE) initiates a tracking area update (TAU) request, judge whether an updated target serving gateway (SGW) is the same as a source serving gateway (SGW); the second judgment component 20 is coupled to the first judgment component 10, and is configured to, in a case where a judgment result of the first judgment component is that the updated target SGW is not the same as the source SGW, judge whether an evolved base station (eNodeB) currently accessed by the UE is changed; and the execution component 30 is coupled to the second judgment component 20, and is configured to, in a case where the eNodeB currently accessed by the UE is not changed, select the target SGW to serve the UE and send the eNodeB a notification message indicating that the UE is switched over to a serving area of the target SGW, or stop selecting an SGW for the UE but directly instruct the UE to continue to be served by the source SGW.

Figure 11:
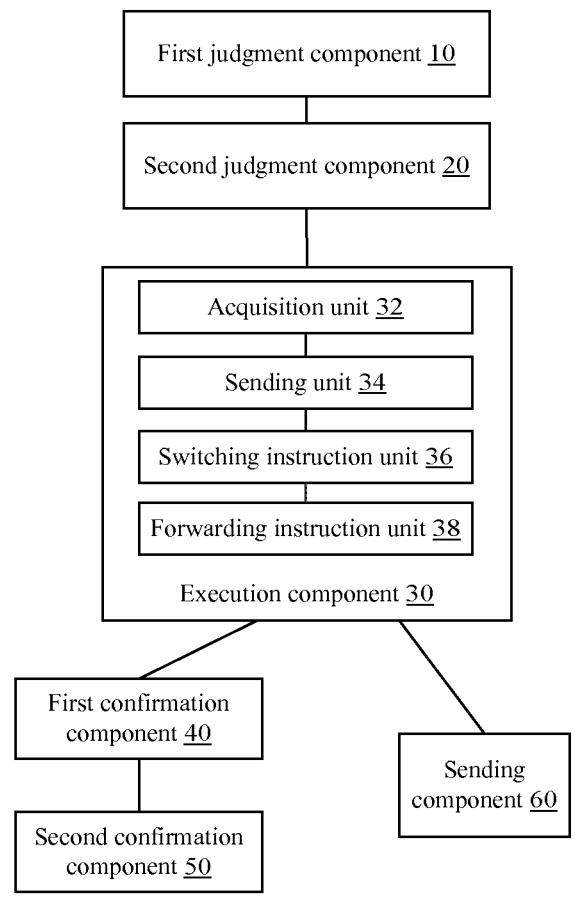
FIG. 11 is a structural block diagram of an apparatus for maintaining service continuity of a user equipment after a tracking area is updated according to an example embodiment of the disclosure.

FIG. 11 is a structural block diagram of an apparatus for maintaining service continuity of a user equipment after a tracking area is updated according to an example embodiment of the disclosure. As shown in FIG. 11, the apparatus may also include: a first confirmation component 40, coupled to the execution component 30, and configured to, after the execution component selects the target SGW to serve the UE, confirm that a core network has successfully established first bearer context for the UE on the target SGW; and a second confirmation component 50, coupled to the first confirmation component 40, and configured to confirm that a tracking area update is successful according to the establishment of the first bearer context, and send an accept message indicating that the tracking area update is successful to the UE.

In this embodiment, the execution component 30 may include: an acquisition unit 32, configured to acquire an Internet protocol (IP) address and a tunnel endpoint identifier (TEID) of the UE bearer on the target SGW, wherein the IP address and the TEID are able to indicate that the UE has been switched over to the serving area of the target SGW; and a sending unit 34, coupled to the acquisition unit 32, and configured to carry the IP address and the TEID in the notification message and send the notification message to the eNodeB.

Preferably, the execution component 30 may further include: a switching instruction unit 36, coupled to the sending unit 34, and configured to instruct the eNodeB to switch an uplink of a UE bearer from the source SGW onto the target SGW according to the IP address and the TEID in the notification message; and a forwarding instruction unit 38, coupled to the switching instruction unit 36, and configured to, in a case where a switching operation is successful, instruct the eNodeB to receive an uplink service packet sent by the UE and forward the uplink service packet to the target SGW.

In this embodiment, the apparatus may further include: a sending component 60, coupled to the execution component 30, and configured to, after the execution component 30 selects the target SGW to serve the UE and sends the eNodeB a notification message indicating that the UE is switched over to a serving area of the target SGW, or stops selecting an SGW for the UE but directly instructs the UE to continue to be served by the source SGW, send an accept message indicating that the tracking area update is successful to the UE.

By applying the apparatus for maintaining service continuity of a user equipment after a tracking area is updated provided by the embodiments above, after a tracking area update (TAU) in which an eNodeB is not changed while an SGW is changed occurs to a UE, an MME selects a target SGW to serve the UE and sends the eNodeB a notification message indicating that the UE is switched over to a serving area of the target SGW, or the MME stops selecting an SGW for the UE but directly instructs the UE to continue to be served by a source SGW, which enables the eNodeB to adjust a UE service path in time after learning a bearer uplink IP address and TEID change of the UE in this scenario, thereby maintaining service continuity of a UE after a TAU process, and improving the user experience.

It can be seen from the description above that the disclosure achieves the following technical effects: in the scenario where a tracking area update (TAU) in which an eNodeB is not changed while an SGW is changed occurs to a UE, an MME selects a target SGW to serve the UE and sends the eNodeB a notification message indicating that the UE is switched over to a serving area of the target SGW, or the MME stops selecting an SGW for the UE but directly instructs the UE to continue to be served by a source SGW, so as to solve the problem of a UE service interruption since the eNodeB cannot learn a bearer uplink IP address and TEID change of the UE in the scenario where a tracking area update (TAU) in which the eNodeB is not changed while the SGW is changed occurs to the UE, thereby maintaining service continuity of a UE after a TAU process, and improving the user experience.

Obviously, those skilled in the art should know that each of the mentioned components or steps of the disclosure can be realized by universal computing devices; the components or steps can be focused on single computing device, or distributed on the network formed by multiple computing devices; selectively, they can be realized by the program codes which can be executed by the computing device; thereby, the components or steps can be stored in the storage device and executed by the computing device; and under some circumstances, the shown or described steps can be executed in different orders, or can be independently manufactured as each integrated circuit component, or multiple components or steps thereof can be manufactured to be single integrated circuit component, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any modification, equivalent replacement, or improvement made within the spirit and principle of the disclosure shall all fall within the protection scope as defined by the appended claims of the disclosure.

What is claimed is:

1. A method for maintaining service continuity of a user equipment after a tracking area is updated, comprising:
    after a user equipment (UE) initiates a tracking area update (TAU) request, a mobility management entity (MME) judging whether an updated target serving gateway (SGW) is the same as a source serving gateway (SGW);
    in a case where a judgment result is that the updated target SGW is not the same as the source SGW, the MME further judging whether an evolved base station (eNodeB) currently accessed by the UE is changed; and
    in a case where the eNodeB is not changed, the MME stopping selecting an SGW for the UE but directly instructing the UE to continue to be served by the source SGW.

2. The method according to claim 1, wherein after the MME selects the target SGW to serve the UE, the method further comprises:
    the MME confirming that a core network has successfully established first bearer context for the UE on the target SGW; and
    the MME confirming that a tracking area update is successful according to the establishment of the first bearer context, and sending an accept message indicating that the tracking area update is successful to the UE.

3. The method according to claim 1, wherein after the MME carries the IP address and the TEID in the notification message and sends the notification message to the eNodeB, the method further comprises:
    the eNodeB switching an uplink of a UE bearer from the source SGW onto the target SGW according to the IP address and the TEID in the notification message; and
    in a case where a switching operation is successful, receiving an uplink service packet sent by the UE, and forwarding the uplink service packet to the target SGW.

4. The method according to claim 1, wherein after the MME selects the target SGW to serve the UE and sends the eNodeB the notification message indicating that the UE is switched over to the serving area of the target SGW, or the MME stops selecting an SGW for the UE but directly instructs the UE to continue to be served by the source SGW, the method further comprises:
    the MME sending an accept message indicating that a tracking area update is successful to the UE.

5. An apparatus located in a mobility management entity (MME) for maintaining service continuity of a user equipment after a tracking area is updated, comprises a hardware processor, configured to perform programming components stored in a memory, wherein the programming components comprise:
    a first judgment component, to determine, whether an updated target serving gateway (SGW) is the same as a source serving gateway (SGW), after a user equipment (UE) initiates a tracking area update (TAU) request;
    a second judgment component, to determine whether an evolved base station (eNodeB) currently accessed by the UE is changed, when the first judgment component is that the updated target SGW is not the same as the source SGW; and
    an execution component, to stop selecting an SGW for the UE but directly instruct the UE to continue to be served by the source SGW, when the second judgment component determines that the eNodeB currently accessed by the UE is not changed.

6. The apparatus according to claim 5, wherein the apparatus further comprises:
    a first confirmation component performed by the hardware processor, to, confirm that a core network has successfully established first bearer context for the UE on the target SGW, after the execution component selects the target SGW to serve the UE; and
    a second confirmation component performed by the hardware processor, to confirm that a tracking area update is successful according to the establishment of the first bearer context, and send an accept message indicating that the tracking area update is successful to the UE.

7. The apparatus according to claim 5, wherein the execution component further comprises:
    a switching instruction unit, to instruct the eNodeB to switch an uplink of a UE bearer from the source SGW onto the target SGW according to the IP address and the TEID in the notification message; and
    a forwarding instruction unit, to instruct the eNodeB to receive an uplink service packet sent by the UE and forward the uplink service packet to the target SGW, when a switching operation is successful.

8. The apparatus according to claim 5, wherein the apparatus further comprises:
    a sending component performed by the hardware processor, to send an accept message indicating that the tracking area update is successful to the UE, after the execution component selects the target SGW to serve the UE and sends the eNodeB the notification message indicating that the UE is switched over to a serving area of the target SGW, or stops selecting an SGW for the UE but directly instructs the UE to continue to be served by the source SGW.

* * * * *